Sept. 22, 1964   A. S. TRUNDY   3,149,386
FABRIC FASTENING DEVICE
Filed Nov. 6, 1962
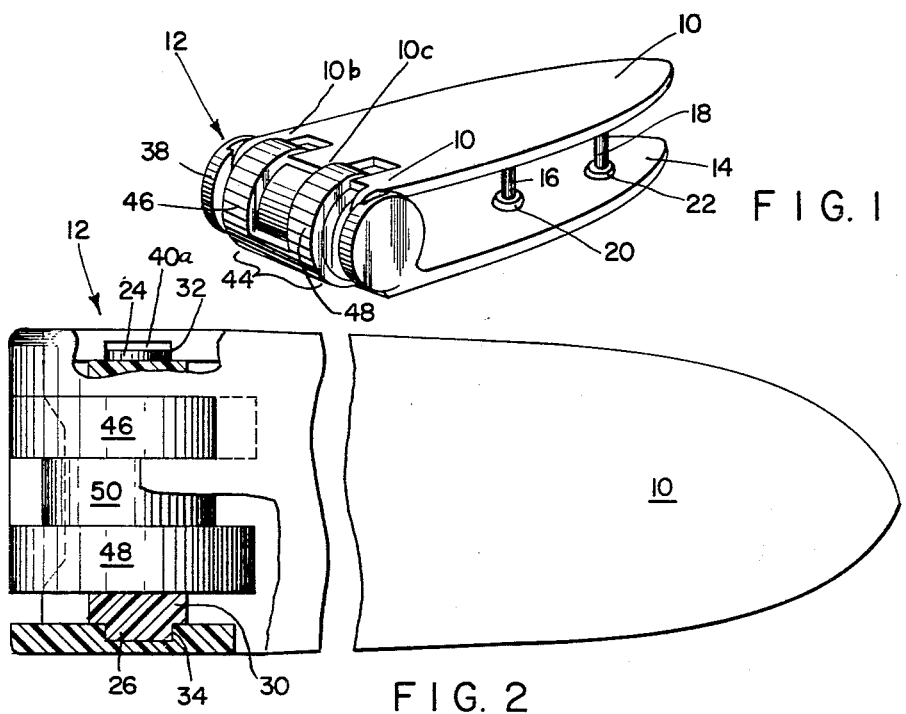
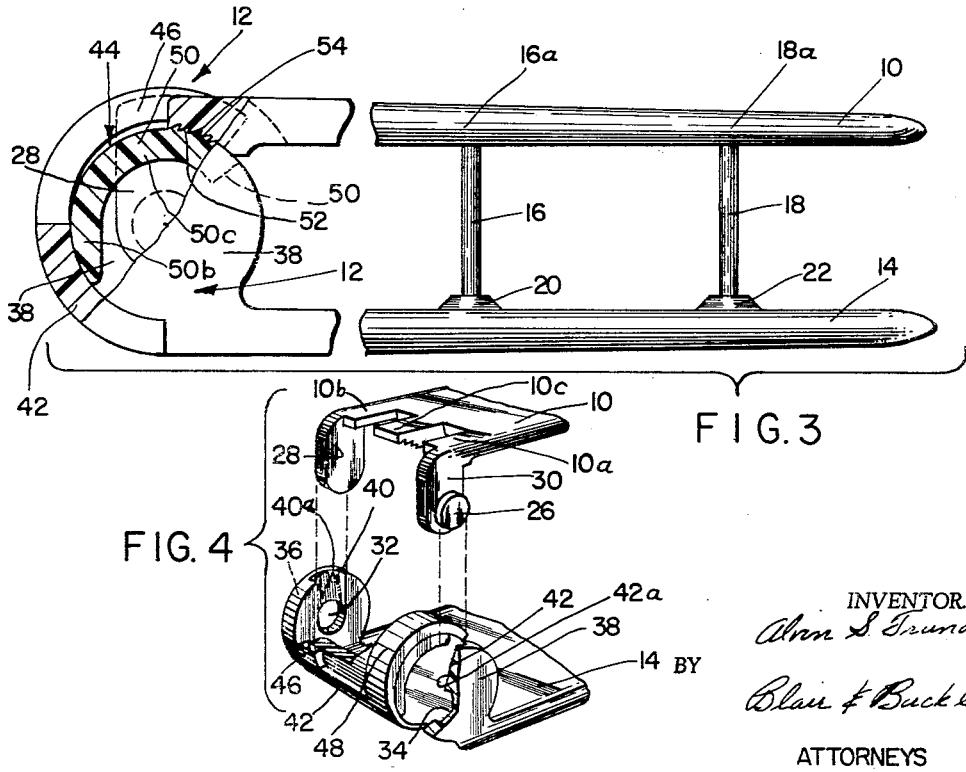
INVENTOR.
Ann S. Trundy
BY
Blair & Buckles
ATTORNEYS 3,149,386
FABRIC FASTENING DEVICE
Alvin S. Trundy, Buxton, Maine
(R.F.D. 3, Gorham, Maine)
Filed Nov. 6, 1962, Ser. No. 235,637
5 Claims. (Cl. 24—157)

This invention relates to a low cost fastener for fabric or the like having a novel hinge and lock arrangement. The fastener is highly reliable and particularly suited for fastening diapers and the like. The unique hinge construction allows the fastener to be readily assembled from two inexpensively fabricated parts, and the fastener's lock practically precludes accidental opening while allowing the fastener to be readily opened and locked shut when desired.

An object of the invention is to provide an improved fastener for thin flexible material.

Another object of the invention is to provide a clothing fastener affording maximum safety to the user.

Yet another object of the invention is to provide a fabric fastener of the above character that is readily locked shut.

Still another object of the invention is to provide a fabric fastener of the above character that is readily opened with one hand.

A further object of the invention is to provide a fabric fastener having the foregoing features than can be manufactured at minimum cost.

Other objects of the invention will in part be obvious and will in part appear hereinafter.

The invention accordingly comprises the features of construction, combination of elements and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawings, in which:

FIG. 1 is a perspective view of a fabric fastener embodying the invention,

FIG. 2 is a top plan view, partly broken away, of the fabric fastener of FIG. 1, FIG. 3 is a side elevation view, partly broken away, of the fastener, and FIG. 4 is an exploded fragmentary view of the fastener showing the hinge construction in detail.

In general, the fabric fastener has two arms joined with a novel hinge that allows the arms to rotate from a substantially in-line open position to a locked position wherein the arms are substantially in register. Prongs secured to one arm extend to the other arm when the fastener is closed to securely grasp fabric between the arms.

Teeth formed on the inside of one arm engage mating teeth formed on an arcuate extension of the other arm to lock the fastener shut. The lock is readily released by depressing the extension to disengage the toothed surfaces.

More specifically, as shown in FIGS. 1 and 3, the illustrated embodiment of the fastener is constructed with an upper arm 10 hinged at 12 to a lower arm 14. When the fastener is closed, as illustrated, the arms 10 and 14 are substantially in register and parallel with each other. Pins 16 and 18, secured to the underside of arm 10, engage relieved bosses 20 and 22, formed on the upper side of arm 14. In this position, the pins pass through fabric folds (not shown), thus securing the fabric to the fastener.

The hinge 12 is constructed, as best seen in FIG. 4, with cylindrical stubs 24 and 26 extending axially from tabs 28 and 30 that depend from the arm 10. Sockets 32 and 34 (FIG. 2), formed in tabs 36 and 38 extending upward from the arm 14, rotatably accommodate the stubs 24 and 26 to allow the arm 10 to rotate with respect to arm 14. The tabs 36 and 38 have tapered recesses 40 and 42 provided with inclined camming surfaces 40a and 42a. The depth of the tapered recesses 40 and 42 is greatest at the top of the tabs 36 and 38 and gradually diminishes along the camming surfaces to the sockets 32 and 34.

The fastener is assembled by positioning the arms 10 and 14 to align the stubs 24 and 26 in the recesses 40 and 42 respectively and then pressing the arms together. The stubs 24 and 26 slide along the camming surfaces 40a and 42a, thus camming the tabs 28 and 30 together and the tabs 36 and 38 apart until the stubs 24 and 26 snap into place in the sockets 32 and 34. This assembly is readily carried out either automatically or with unskilled labor in a matter of seconds.

Since the recesses 40 and 42 are not as deep as the sockets 32 and 34, particularly where they run into the sockets, the stubs 24 and 26 are securely held in the sockets and cannot detach therefrom by way of the recesses.

As best seen in FIGS. 1 and 3, the lock for the fastener is formed with an arcuate extention indicated, generally at 44, that loops from arm 14 upward around the hinge 12 and curves under the upper arm 10. The extension 44 has raised portions 46 and 48 formed on opposite sides of a depressed portion 50. The portion 50 has serrations or teeth 52 (FIGS. 2 and 3) on its upper surface adjacent its free end 50a remote from the arm 14. As shown in FIG. 3, the depressed portion 50 has an inverted J-shaped cross section formed by a vertical section 50b, extending from arm 14, and a hook 50c.

As shown in FIGS. 1 and 4, the end of arm 10 adjacent to hinge 12 has recesses 10a and 10b on opposite sides of a central tongue 10c. The raised portions 46 and 48 of the extension 42 freely fit in the recesses 10a and 10b while the hook 50c of depressed portion 50 extends under the tongue 10c. The hook interferes slightly with tongue 10c to deflect the tongue upward and the hook downward, thereby maintaining a resilient pressure between them. Serrations or teeth 54 on the underside of the tongue 10c engage the teeth 52 when the fastener is closed.

The teeth 52 and 54 preferably have a "sawtooth" buttress cross-sectional appearance, so that when the fastener is being closed by rotating the arms 10 and 14 toward each other around the stubs 24 and 26 and sockets 32 and 34, the teeth 52 and 54 slide past each other, slightly camming the hook 50c and the tongue 10c apart. However, once the fastener is closed, the teeth 52 and 54 mesh to prevent it from opening. Thus, the hook 50c and the tongue 10c operate essentially as a ratchet mechanism, allowing substantially unrestricted fastener closure while providing a positive lock to prevent the fastener from opening.

To open the fastener, the portions 46 and 48 are depressed, carrying with them the depressed portion 50. This separates the portion 50 from the tongue 10c and thereby disengages the teeth 52 from the teeth 54. In the event that the raised portions 46 and 48 are accidentally depressed when the fastener is closed, the arms 10 and 14 will open only to the extent that they are simultaneously urged apart. As soon as the pressure on the portions 46 and 48 is removed, they will immediately relock, though perhaps in a slightly opened condition, with the pins 16 and 18 still engaging the fabric secured by the fastener. In any event, it is extremely unlikely that the arms 10 and 14 will accidentally swing open enough for the pins 16 and 18 to present a hazard.

The above-described embodiment of the fastener is thus constructed in two parts, each preferably molded of a high impact plastic material. The pins 16 and 18, spaced from the hinge 12, can be molded integral with the arm 10 or made of a suitable material as stainless steel with enlarged heads 16a and 18a, shown in FIG. 3, embedded in the arm 10.

In summary, I have described a novel fabric fastener readily fabricated in two parts that snap-lock together with a novel hinge construction. Mating, ratchet-like teeth on the hinge end of each part positively engage with resilient pressure to securely lock the fastener's two arms together and effectively resist accidental opening.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

I claim:

1. A fastener for flexible material comprsing in combination
    (a) first and second arms having
        1) material holding means for retaining flexible material between opposed surfaces of said arms when said fastener is closed,
        (2) a first buttress-type series of sawtooth serrations on said first arm at a first end thereof and on a surface thereof opposed to said second arm,
    (b) a hinge joining said arms at first ends thereof,
    (c) a resilient member having a second buttress-type series of sawtooth serrations thereon,
        (1) said member arcuately extending from said second arm and pressing said second series of sawtooth serrations into engagement with said first series of sawtooth serrations when said fastener is closing, thereby to lock said arms in the closed position, and
        (2) a raised portion projecting on said member away from said second arm and from said second serrated surface and being depressable to disengage said second series of sawtooth serrations from said first series of sawtooth serrations to allow said fastener to be opened.

2. The fastener defined in claim 1 in which said hinge comprises
    (a) means extending from said second arm and forming a pair of cylindrical sockets coaxial with the rotation axis of said hinge,
    (b) a pair of cylindrical stubs supported by tabs extending from said first arm,
    (c) said stubs axially extending along the hinge axis and being rotatably seated in said sockets.

3. A fabric fastener comprising in combination
    (a) an upper arm
        (1) formed with a pair of recesses at a first end thereof,
        (2) having a tongue between said recesses with serrations on the lower surface of said tongue, and
        (3) having a pair of tabs depending therefrom adjacent to longitudinal edges at an end thereof,
        (4) a cylindrical stub extending from each tab, away from the other tab and coaxial with the other stub,
    (b) a lower arm having a pair of projections extending upward therefrom adjacent longitudinal edges at an end thereof,
        (1) means forming a socket in each projection facing the other projection and coaxial with the other socket,
        (2) means forming an inclined recess in each projection between the top edge thereof and the socket therein,
        (3) said recesses having minimum depth adjacent said sockets, to enable said fastener to be assembled by moving said stubs along said recesses toward said sockets to cam said tabs together and said projections apart until said stubs snap into said sockets to form a hinge joining said arms,
    (c) an arcuate member extending from said lower arm around the rotation axis of said hinge and looping to said first end of said upper arm,
        (1) a hook on said member extending under said tongue portion and having serrations on the upper surface thereof engaging said serration on said tongue and thereby preventing said arms from moving apart by rotation of said hinge,
        (2) a pair of raised portions on said arcuate member protruding above said upper arm through said upper arm recesses, said raised portions being depressable to deflect said member and thereby disengage said serrations to unlock said fastener.

4. A fastener for flexible material comprising in combination
    (a) first and second arms having
        (1) material holding means for retaining flexible material between opposed surfaces of said arms when said fastener is closed,
        (2) a first serrated surface on said first arm at a first end thereof and on a surface thereof opposed to said second arm,
    (b) a hinge,
        (1) said hinge joining said arms at first ends thereof,
        (2) said hinge being arranged to dispose said arms in a closed position, spaced apart and substantially in registry with each other,
    (c) a resilient member having a second serrated surface,
        (1) said member arcuately looping from said second arm away from the other ends of said arms and around the rotation axis of said hinge toward said first arm to press said second serrated surface against said first serrated surface when said fastener is closing, thereby to lock said arms in the closed position,
        (2) a pair of raised shoulder portions on said member extending along arcuate edges thereof and being depressable to disengage said second serrated surface from said first serrated surface to allow said fastener to be opened,
        (3) said resilient member having a depressed portion between said shoulder portions,
        (4) said second serrated surface being on said depressed portion,
    (d) said first arm
        (1) having two longitudinal recesses in its first end to allow said shoulder portions to extend between said arms without interfering with their rotation about said hinge,
        (2) said first serrated surface being on the portion of said first arm between said recesses therein.

5. A fastener for flexible material comprising in combination
    (a) first and second arms having
        (1) material holding means for retaining flexible material between opposed surfaces of said arms when said fastener is closed, (2) a first serrated surface on said first arm at a first end thereof and on a surface thereof opposed to said second arm, (b) a hinge joining said arms at first ends thereof and constructed to dispose said arms in a closed position, spaced apart and substantially in register with each other, and (c) a resilient member having a second serrated surface, (1) said member arcuately looping from said second arm away from the other ends of said arms and around the rotation axis of said hinge toward said first arm and pressing said second serrated surface against said first serrated surface when said fastener is closing, thereby to lock said arms in the closed position, and (2) a raised portion on said member depressable to disengage said second serrated surface from said first serrated surface to allow said fastener to be opened.

References Cited in the file of this patent

UNITED STATES PATENTS

| | | |
|---|---|---|
| 724,695 | Greenwood | Apr. 7, 1903 |
| 2,008,382 | Bennett | July 16, 1955 |
| 2,968,852 | Moonan | Jan. 24, 1961 |
| 3,020,734 | Withers | Feb. 13, 1962 |

FOREIGN PATENTS

| | | |
|---|---|---|
| 491,713 | France | Feb. 13, 1919 |